United States Patent [19]

Jeram et al.

[11] 4,340,709
[45] Jul. 20, 1982

[54] ADDITION CURING SILICONE COMPOSITIONS

[75] Inventors: Edward M. Jeram, Burnt Hills; Alfred H. Smith, Jr., Ballston Lake, both of N.Y.

[73] Assignee: General Electric Company, Waterford, N.Y.

[21] Appl. No.: 169,259

[22] Filed: Jul. 16, 1980

[51] Int. Cl.$^3$ .............................................. C08G 77/06
[52] U.S. Cl. ................................. 528/15; 264/331.11; 264/328.6; 264/328.17; 264/328.18; 528/31; 528/32
[58] Field of Search ........................... 528/15, 31, 32; 264/331.11, 328.6, 328.2, 328.17, 328.18; 260/31.8 S

[56] References Cited

U.S. PATENT DOCUMENTS

| | | | |
|---|---|---|---|
| 3,220,972 | 11/1965 | Lamoreauh | 260/46.5 |
| 3,436,366 | 4/1969 | Modic | 260/37 SB |
| 3,957,713 | 5/1976 | Jeram | 260/32.8 SB |
| 4,029,629 | 6/1977 | Jeram | 260/37 SB |
| 4,041,010 | 8/1977 | Leram | 260/42.26 |
| 4,061,609 | 12/1977 | Bobear | 260/9 |

*Primary Examiner*—Melvyn I. Marquis
*Attorney, Agent, or Firm*—E. Philip Koltos

[57] ABSTRACT

An addition curing silicone composition with a low viscosity in the uncured state and high physical strength in the cured state comprising a vinyl-containing diorganopolysiloxane polymer, a platinum catalyst, a hydride cross-linking agent and a linear hydride coupler in which the viscosity of the linear hydride coupler varies from 1 to 1,000 centipoise at 25° C.

24 Claims, No Drawings

ADDITION CURING SILICONE COMPOSITIONS

BACKGROUND OF THE INVENTION

The present invention relates to addition curing system and more particularly the present invention relates to addition curing systems which have a low viscosity in the uncured state and high physical strength in the cured state.

The addition curing SiH olefin systems are well known. Basically such system comprise a vinyl containing diorganopolysiloxane base polymer, a platinum catalyst and a hydride cross-linking agent which can be either a linear hydride or a hydride containing resin composed of monofunctional units and tetrafunctional units or a hydride resin composed of monofunctional units, tetrafunctional units and difunctional siloxy units. An early patent on such type of compositions is that of Modic U.S. Pat. No. 3,436,366 which discloses the use of a silicone resin composed of monofunctional siloxy units, difunctional siloxy and tetrafunctional siloxy units. This resin has a certain vinyl content and is utilized as an additive to the basic SiH olefin platinum catalyst composition. It has been found that this composition may be useful as both a molding and encapsulating composition. The use of vinyl containing resins permits the lowering of the amount of silica filler there is incorporated in the composition. As a result the composition has good physical strength with a low viscosity in the uncured state making the composition an excellent composition as far as potting and encapsulate uses.

A further modification of such systems can be found in Jeram et al U.S. Pat. No. 3,957,713 which is hereby incorporated in the present case by reference. This patent discloses that a high strength silicone composition be obtained by incorporating in the basic vinyl SiH olefin platinum catalyzed systems a low viscosity polysiloxane fluid which is terminated at one end of the polymer chain with triorganosiloxy groups and the other end polymer chain with a vinyl diorganosiloxy groups. It was also disclosed in such systems there could be utilized from 5 to 70 parts of a filler, which is preferably a fumed silica or precipitated silica treated filler. The silica could be either treated with cyclic polysiloxane or silazanes or preferably both. It is necessary to have all these ingredients in the compositions to arrive at a high strength in the cured state that is a tear strength in the 100 to 200 psi range.

Recently, there have been developments in the field of molding compositions, specifically there has been developed liquid injection molding apparatus forming plastic parts. The cost of this apparatus is expensive. However, by the use of this apparatus, molded parts could be formed at a very cheap cost because there is a small amount of material utilized to encapsulate the part or the component, for instance, in the formation of encapsulated parts with little waste, and molding can be done very rapidly to result in the savings of labor costs. There have been attempts to develop silicone compositions for such an application. The difficulty with composition of U.S. Pat. No. 3,957,713 was that the composition did not have a sufficiently low viscosity in the uncured state. For liquid injection molding machines, it is desired that the uncured viscosity be as low as possible, but generally in the range of 10,000 to 500,000 centipoise at 25° C. If the composition has this viscosity, it can be readily forced into the molding chamber of the liquid injection molding machine and then the composition has to have another property, that is, it has to cure at a sufficiently rapid rate. Upon being heated to elevated temperatures, the molded parts can be formed with rapidity. The faster the parts are formed by the liquid injection molding machine, the lower the cost of the part that is formed and the more is the saving in labor that it realized compared to the production of such molded parts by a different method.

For such liquid molding application, it was desirable to develop a silicone composition which could be utilized readily. It was highly desirable to have a silicon composition such as that of Modic which would have a sufficient tear strength in the range of 100 to 200 pi in the cured state and the composition would have a viscosity in the uncured state varying from 10,000 to 500,000 centipoise at 25° C. and more preferably varying from 10,000 to 200,000 centipoise at 25° C. In addition, it is desired that the composition be able to be cured at elevated temperature; that is temperatures above 100° C. in a period of 1 to 10 seconds.

It should be noted as disclosed in Bobear U.S. Pat. No. 4,061,609 which is hereby incorporated by reference that hydroperoxy inhibitors have been developed which can be incorporated to SiH platinum addition systems such that they can be packaged in a single package such that it will not cure at room temperature but would cure rapidly at elevated temperatures about 100° C.

Further, one successful attempt to produce such liquid injection molding compositions was the production of silicone polymers that are fluorosubstituted such that the cured part has good solvent resistance as disclosed in the patent application of Jeram, U.S. Pat. No. 4,041,010 which is hereby incorporated by reference. The patent discloses fluorosilicone compositions comprising as the base fluorosilicone polymer a vinyl fluorosilicone resin combined with a hydride cross-linking agent and a platinum catalyst. The composition disclosed that optionally there may be utilized a filler in the composition; however, in order to get the higher tensile strengths of the composition, it is necessary to incorporate a filler. Accordingly, this composition is not altogether as advantageous as would be desired.

Another disclosure of a fluorosilicone composition which can be utilized in liquid injection molding machines is to be found in Jeram U.S. Pat. No. 4,029,629 which is hereby incorporated by reference. This composition discloses the use of a reinforcing filler in combination with the basic fluorosilicone composition. Accordingly, for such application the composition of U.S. Pat. No. 4,041,010 is much to be preferred over that of U.S. Pat. No. 4,029,629.

Accordingly, it was highly desirable to find some technology whereby there could be obtained a silicone addition cured composition which would have a low viscosity in the uncured state, that is, in the range of 100,000 to 500,000 centipoise at 25° C. and would have a cured tear strength in the range of 100 to 200 pi in the cured state and such that it would have a fast cure rate of 1 to 10 seconds at elevated temperatures, that is, temperatures about 100° C. It is preferred in such a composition in order to keep the viscosity low in the uncured state that the composition contain as low an amount of reinforcing filler as can possibly be used consistent with a high strength in the cured state.

Accordingly, it is one object of the present invention to provide an SiH olefin addition cured system having a high strength in the cured state and a low viscosity in the uncured state.

It is another object of the present invention to provide for an SiH olefin platinum catalyst addition cured system which has a fast cure rate at elevated temperature.

It is still another object of the present invention to provide for an SiH olefin platinum catalyzed addition cured system which is suitable for liquid injection molding applications.

It is still an additional object of the present invention to provide for a process for producing an SiH olefin platinum catalyzed addition cured system which has high strength in the cured state and low viscosity in the uncured state. These and other objects of the present invention are accomplished by means of the disclosure set forth herein below.

SUMMARY OF THE INVENTION

In accordance with the above objects there is provided by the present invention, an addition curing silicone composition with a low viscosity in the uncured state and high strength in the cured state comprising (A) 100 parts by weight of a base vinyl containing diorganopolysiloxane polymer having a viscosity varying from 100 to 200,000 centipoise at 25° C. where the vinyl content varies from 0.14 to 2.0 mole percent and the organo group is a monovalent hydrocarbon radical; (B) from 0.1 to 500 parts per million of a platinum (C) from 0.1 to 25 parts by weight of a cross-linking agent selected from the class consisting of hydride resins having only terminal hydrogen atoms or a linear hydride polysiloxane containing hydrogen atoms only in internal portion of the silicone chain; and (D) from 4 to 15 parts by weight a coupler which is a linear hydride polysiloxane with hydrogen atoms on only the terminal silicone atoms in the siloxane chain with a hydride concentration of 3.0 to 9.0 mole percent where the viscosity of the linear hydride ranges from 1 to 500 centipoise at 25° C. Preferably the linear hydride coupler has the formula,

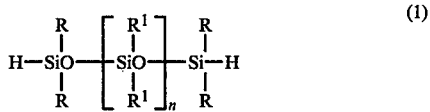

where R, R$^1$ are monovalent hydrocarbon radicals other than olefinic hydrocarbon radicals and n varies such that the viscosity of the polymer varies from 1 to 500 centipoise at 25° C.

The coupler is utilized in the composition so as to increase the molcular chain length of the vinyl containing vinyl terminated diorganopolysiloxane base polymer to high molecular weight without increasing the viscosity of the composition in the uncured state. However, the high molecular weight diorganopolysiloxane vinyl containing base polymer that results from reaction with the coupler in the initial base polymer results in a composition with good physical strength in the cured state and a rapid cure rate at elevated temperatures.

DESCRIPTION OF THE PREFERRED EMBODIMENT

The basic constituents of the instant composition comprises 100 parts by weight of a base vinyl containing diorganopolysiloxy polymer having a viscosity varying from 100 to 200,000 centipoise at 25° C. where a (CH$_3$)$_2$ViSiO$_{0.5}$ content generally varies from 0.05 and 3.5 and more preferably varies from 0.14 to 2.0 mole percent. The organic groups are monovalent hydrocarbon radicals preferably the organo groups are selected from alkyl radicals such as methyl ethyl propyl, etc; alkenyl radicals such as vinyl, allyl, etc.; cycloalkyl radical such as cyclohexyl, cycloheptyl, and etc.; mononuclear aryl radicals such as phenyl, ethylphenyl etc.; and haloalkyl such as 3,3,3-trifluoropropyl. Most preferably the monovalent hydrocarbon radical is selected from an alkyl radical of 1 to 8 carbon atoms or phenyl. Preferably there is no vinyl or alkenyl radicals in the central part of the polysiloxane chain of the base vinyl containing polymer. This is especially important in the instant case since the vinyl groups in the internal position of the polymer chain will tend to cross-link with a coupler rather than be chain extended. Accordingly, preferbly, the base vinyl containing polymer does not have any vinyl groups of olefinical unsaturated groups in the internal position of the polymer chain but just has vinyl in the terminal position of the polymer chain. An example of a structural formula for the vinyl containing diorganopolysiloxane base polymer is as follows:

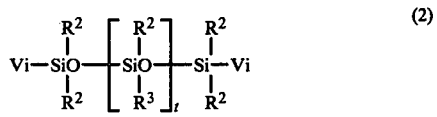

where Vi is vinyl and R$^2$ and R$^3$ are monovalent hydrocarbon radicals other than olefinic hydrocarbon radicals and t varies such that the diorganopolysiloxane polymer viscosity varies from 100 to 200,000 centipoise at 25° C. Preferably R$^2$ and R$^3$ are selected from alkyl radicals of 1 to 8 carbon atoms such as methyl ethyl propyl; mononuclear aryl radicals such as pheyl, methylphenyl, ethylphenyl; cycloalkyl radicals, cycloheptyl and haloalkyl radicals such as 3,3,3-trifluoropropyl. Most preferably the R$^2$ and R$^3$ radicals are selected from alkyl radicals of 1 to 8 carbon atoms and phenyl.

The polymers of Formula (2) are generally prepared by equilibrating the appropriate cyclo tetrasiloxane with the appropriate vinyl terminated low molecular weight polysiloxane chainstoppers. The chain-stopper is preferred for such equilibration reaction and is preferably a low molecular weight vinyl terminated polysiloxane compounds such as a disiloxane, trisiloxane, tetrasiloxane and so forth. These low molecular weight vinyl terminated polysiloxane polymers are produced by hydrolyzing the appropriate chlorosilanes particularly vinyl diorganochlorosilanes along with diorganodichlorosilanes to produce the desired chainstopper. This chainstopper is then taken in a relatively pure form and equilibrated along the cyclotetrasiloxanes with the appropriate substitute groups in the presence of a catalyst to produce the desired vinyl terminated diorganopolysiloxane polymer having a viscosity varying from 100 to 200,000 centipoise at 25° C. The catalyst that is utilized is preferably a mild acid catalyst, such as toluene, sulfonic acid or an acid treated clay such as filtrol, which a sulfuric acid activated clay manufactured and sold by Filtrol Corporation of Los Angeles, California. When the equilibration has proceeded to the point where about 85% of the cyclopolysiloxanes have been converted to the linear polymer, the acid catalyst is neutralized with a base or simply filtered out in the case of the acid activated clay to leave behind the linear polymer. Preferably excess cyclics are stripped off so that the linear polymer will have a low volatile content and be relatively pure. There can also be utilized an alkali metal hydroxide as the catalyst such as for instance potassium or sodium hydroxide.

The second necessary ingredient in the composition of the instant case is from 0.1 to 25 parts by weight per 100 parts the base vinyl containing polymer of a cross-linking agent selected from the class consisting of hydride resins having only terminal hydrogen atoms or a hydride polysiloxane having hydrogen atoms solely in the internal portion of the polysiloxane chain. Accordingly, there may be utilized a hydride resin having the formula,

units and $SiO_2$ units where the $R^4+H$ to Si ratio varies from 1.0 to 2.7 or a hydride resin of the formula,

units, $SiO_2$ and $R^6R^6SiO$ units where the $R^5+R^6+H$ to Si varies from 1.2 to 2.7 where $R^4$, $R^5$ and $R^6$ are monovalent hydrocarbon radicals other than olefinic hydrocarbon radicals.

Most preferably $R^4$, $R^5$, $R^6$ are selected from alkyl radicals of 1 to 8 carbon atoms; mononuclear aryl radicals such as phenyl, ethyl phenyl, etc.; cycloalkyl radicals such as cycloheptyl, cyclooctyl; etc.; haloalkyl radicals such as 3,3,3-trifluoropropyl, etc. most preferably $R^4$, $R^5$, $R^6$ as selected from alkyl radicals of 1 to 8 carbon atoms and phenyl radicals. It is important that there be no aliphatic unsaturated groups for the $R^4$, $R^5$, $R^6$ radicals. These hydrides can be simply produced in the controlled hydrolysis of the corresponding hydride chlorosilanes in the presence of a hydrocarbon organic solvent. For the resin containing only monofunctional units and tetrafunctional units, a hydrogen diorganochlorosilane is hydrolyzed along with a tetrachlorosilane to produce the desired resin. In the case of the resin containing the monofunctional siloxy units, the difunctional siloxy units, and the tetrafunctional siloxy units, there is hydrolyzed a hydrogen diorgano dichlorosilane, a tetrachlorosilane and a diorganodichlorosilane in the desired ratios to produce the desired resins. For more information as to the process by which said resins are produced, one is referred to the patent of E. M. Jeram, U.S. Pat. No. 4,040,101 which is hereby incorporated by reference.

In place of the hydride resins as cross-linking agents which are undesirable to some extent since they may cross-link the composition too much for the hydride coupler to work, there may be used a linear hydrogen containing polysiloxane as the cross-linking agent. Accordingly, as the cross-linking agent, there may be utilized a linear hydride polysiloxane having the formula,

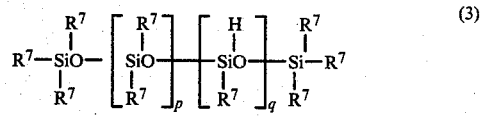

where $R^7$ is a monovalent hydrocarbon radical other than an olefinic hydrocarbon radical and p and q vary such that the polymer has a viscosity that varies from 1 to 1,000 centipoise at 25° C. and wherein the polysiloxane has from 0.04 to 1.4 by weight of hydrogen. The hydride polymer of Formula (3) is noticeable in that there is no hydrogen groups in the terminal silicone atoms. The only hydrogen groups in Formula (3) above is in the internal position of the polymer chain. Accordingly, even though such a polymer cross-links, the base vinyl containing polymer to produce a cross-linked composition, it cannot function as a coupler. Accordingly, it does not compete with the coupler function of the hydride coupler of the instant case.

Such a hydride polymer of Formula (3) above is produced by equilibrating the appropriate hydrogen cyclopolysiloxane with the appropriate cyclo polysiloxane containing $R^7$ substituent groups, in the presence of disiloxane, trisiloxane, and other low molecular weight linear triorganosiloxy end-stopped chain-stoppers. The process is much the same as producing the vinyl containing polymer; however, such hydride cross-linking agents may be made by an alternate process. This alternate process comprises hydrolyzing the appropriate chlorosilanes in water along or in the presence of a hydrocarbon solvent to produce a mixture of cyclics and linear hydride polymers of Formula (3) above. The cyclics can be stripped off.

Along with the cross-linking agent of the base vinyl containing polymer there must be present in the composition, a platinum catalyst. The platinum catalyst may be solid platinum, deposited on a carrier such as charcoal or gammaalumina. It is preferable that the platinum catalyst is a solubilized platinum catalyst complex. It should also be noted that the catalyst may be utilized in the concentration of anywhere from 0.1 to 500 parts per million of the total composition and more preferably, from 0.1 to 100 parts per million of the total composition.

Many types of platinum compounds for this SiH olefin addition reaction are known and such platinum catalysts may be used also for the reaction of the present case. The preferred platinum catalysts especially when optical clarity is required are those platinum compound catalysts which are soluble in the present reaction mixture. The platinum compound can be selected from those having the formula $(PtCl_2Olefin)_2$ and $H(PtCl_3Olefin)$ as described in U.S. Pat. No. 3,159,601 Ashby. The olefin shown in the previous two formulas can be almost any type of olefin but is preferably an alkenylene having from 2 to 8 carbon atoms, a cycloalkenylene having from 5 to 7 carbon atoms or styrene. Specific olefins utilizable in the above formulas are ethylene, propylene, the various isomers of butylene, octylene, cyclopentene, cyclohexene, cycloheptene.

A further platinum containing material usable in the composition of the present invention is the platinum chloride cyclopropane complex $(PtCl_2C_3H_6)_2$ described in U.S. Pat. No. 3,159,662 Ashby.

Still, further, the patent containing material can be a complex formed from chloroplatinic acid with up to 2 moles per gram of platinum of a member selected from the class consisting of alcohols, ethers, aldehydes and mixtures of the above as described in U.S. Pat. No. 3,220,972, Lamoreaux.

All the patents and patent applications mentioned in this present specification are incorporated into the present application by reference.

The preferred platinum compound to be used not only as a platinum catalyst but also as a flame retardant additive is that disclosed in French Pat. No. 1,548,775, Karstedt. Generally speaking, this type of platinum complex is formed by reaction chloroplatinic acid containing 4 moles of water of hydration with tetravinylcyclotetrasiloxane in the presence of sodium bicarbonate in an ethanol solution.

The above form the basic components of the SiH olefin platinum catalyst composition that is a base vinyl containing polymer, a hydride cross-linking agent and a platinum catalyst. The resulting composition will cure to a silicone elastomer at room temperature gradually or at elevated temperatures in a very rapid manner. The way this composition differs from the prior art composition is in the presence of a hydride coupler, which is a linear hydride polysiloxane with hydrogen atoms only a terminal silicone atom in a siloxane chain where the dimethyl hydrogen siloxy content varies from 3.0 to 9.0 mole percent and the viscosity of the linear hydride comprises a coupler varying from 1 to 500 centipoise at 25° C. In formula (1), R and $R^1$ are other than olefinic hydrocarbon radicals. Accordingly, preferably, R can be selected from the group consisting of alkyl radicals of 1 to 8 carbon atoms such as methyl ethyl propyl etc.; cycloalkyl radicals such as cyclohexyl, cycloheptyl, and etc.; mononuclear aryl radicals such as phenyl, methyl, ethyl phenyl, etc.; and haloalkyl radicals such as 3,3,3-trifluoropropyl. Most preferably, the R and $R^1$ radicals are selected from alkyl radicals of 1 to 8 carbon atoms and phenyl radicals. The hydride coupler is prepared by either a hydrolysis process or by acid catalyzed equilibration process. In the equilibration process the appropriate cyclotetrasiloxanes are equilibrated a low molecular weight a hydrogen terminated chain-stoppers, such as a dihydrogen tetraorgano disiloxane. The acid catalyzed equilibration reaction is much the same as that disclosed for the production of the vinyl containing base polymer. By the hydrolysis process the appropriate hydrogen diorganochlorosilanes are hydrolyzed with the appropriate amount of diorganodichlorosilanes to produce the desired polymer of Formula (1) above. When the hydride coupler is produced, it can be separated from the undesirable amount of cyclics by stripping the cyclics from water and other impurities and utilized as a coupler in the addition curing compositions of the instant case.

The amount of coupler utilized is at a weight ratio generally from 0.75 to 1.5 and preferably 0.8 to 1.2 of the silicon bonded vinyl groups present in the base vinyl containing polymer to the silicon bonded hydrogen groups present in the hydride coupler. Accordingly, if there is present from a weight ratio varying from 0.75 to 1.5 and more preferably to 0.9 to 1.2 of silicon bonded vinyl groups in the base vinyl containing polymer to silicon bonded hydride groups in the hydride coupler there will be obtained the proper chain extending activity tht is desired by the hydride coupler. If there is less than this amount of hydride in terms of the hydride coupler in the composition the chains will not be extended enough and if there is more than the desired amount of hydride as indicated by the above ratio in the composition, then there will be too much hydride present and the composition will be slow in curing to a silicone elastomer.

The hydride coupler and hydride cross-linker preferably mixed with the base vinyl containing composition to form a single package, some vinyl polymer preferably mixed with the platinum catalyst to form another package. When it is desired to cure the composition, the two packages are simply mixed together and allowed to cure either gradually at room temperature or rapidly at elevated temperatures, that is, temperatures above 100° C. The platinum catalyst is desirably incorporated along with some vinyl polymer in a separate package. The hydride coupler is mixed with the vinyl containing polymer, along with the platinum. Accordingly, it is desirable that the composition or ingredients are kept apart in two packages such as set forth above. However, it is possible to provide a one-package composition when an appropriate amount of inhibitor is catalyzed which results in a composition that has a shelf life of 6 months or more in a single package. This is possible with a certain inhibitor as will be explained below. By the utilization of the coupler and specifically the hydride couplers as disclosed above, it is possible to obtain a composition in which the chain length of the base vinyl containing polymer is increased to a high molecular weight without unduly increasing the viscosity of the uncured composition. By the utilization of a hydride coupler, it is possible to obtain an addition curing composition with a tensile strength of about 800 psi, elongation of about 400 percent, Tear of 200 psi and Shore Durometer A of about 40.

To obtain the high physical strength of the composition, there may be incorporated from 5 to 100 parts by weight of a filler based on a 100 parts of the base vinyl containing polymer. A filler can be selected from fumed silica, precipitated silica and mixtures thereof. Preferably the amount of fumed or precipitated silica that is utilized in the composition is less than 50 parts by weight based on 100 parts by weight of the base vinyl containing polymer since fumed silica and precipitated silica although they desirably increase the physical strength of the composition, nevertheless, have an undesirable effect in that they increase the viscosity of the uncured composition undesirably. In place of the reinforcing filler such as fumed silica and precipitated silicas, there may be utilized extending fillers which do not unduly increase the viscosity of the composition in the uncured state, but increasing to some extent the tensile strength of the composition. The reinforcing and extending fillers are, for instance, titanium dioxide, lithopone, zinc oxide, zirconium silicate, silica aerogel, iron oxide, diatomaceous earth, calcium carbonate, silazane treated silicas, glass fibers, magnesium oxide, chomic oxide, zirconium oxide, aluminum oxide, alpha quartz, calcined clay, carbon, graphite, cork, cotton, synthetic fibers and so forth.

Many of these fillers and, particularly, fumed silica and precipitated silica, even though they have been treated with silazanes or cyclopolysiloxanes, unduly increase the viscosity of the composition in the uncured state which is undesirable for liquid injection molding applications. Accordingly, for liquid injection molding applications, it is desirable that the total composition has a viscosity that does not exceed 500,000 centipoise at 25° C. and more preferably, does not exceed 200,000 centipoise at 25° C. The lower the viscosity of the uncured total composition can be maintained while the cured composition has good tensile strength and good elonation, the more desirable the composition is for liquid injection molding application. Accordingly, for this reason, it is preferred that there not be used too large a quantity of reinforcing filler and extending fillers in the composition.

A method of increasing the tensile strength of the composition without unduly increasing the uncured viscosity is to incorporate a vinyl containing resin in the composition. Accordingly, per 100 parts by weight of the base vinyl containing polymers, there may be present from 10 to 100 parts by weight of an organo polysiloxane copolymer comprising $R_3^8SiO_{0.5}$ units and $SiO_2$ where $R^8$ is a radical selected from the class containing of vinyl radicals, alkyl radicals and aryl radicals, and fluoroalkyl radicals of 1 to 8 carbon atoms with a ratio of monofunctional units and tetrafunctional units, is from 0.5:1 to 1:1 and where from about 2.5 to 10 mole percent of the silicone atoms contains silicon bonded vinyl groups.

A slightly different resin that can also be used in the composition to increase the tensile strength of the cured composition without unduly increasing the viscosity of the uncured total composition is that there may be incorporated per 100 parts of the base vinyl polymer from 10 to 100 parts by weight of an organo polysiloxane copolymer comprising $R_3^8SiO_{0.5}$ $R_2^8Si$ units and $SiO_2$ where $R^8$ is a radical selected from the class consisting of vinyl radicals, aryl radicals, alkyl radicals and fluoroalkyl radicals with a ratio of monofunctional units, difunctional units is from 0.5:1 to 1:1 and the difunctional units are present in an amount equal from about 1 to 10 mole percent based on the total number of siloxane units in the copolymer and where from about 2.5 to 10 mole percent of the silicone atoms contains silicone bonded vinyl groups. For information as to the utilization of such resins in addition curing compositions one is referred to the issued patent of F. J. Modic, U.S. Pat. No. 3,436,366, which is hereby incorporated by reference. In the above units of the resin, $R^8$ has been disclosed as being selected from vinyl radicals, aryl radicals, and alkyl radicals and fluoroalkyl radicals, more preferably, $R^8$ is selected from vinyl radicals, alkyl radicals of 1 to 8 carbon atoms, phenyl radicals and 3,3,3-trifluoropropyl radicals.

In place of the vinyl containing resins that may be utilized, a polysiloxane polymer having a vinyl group at one terminal position of a siloxane chain and having a triorgano siloxy group on the other terminal position of the polysiloxane chain. Accordingly, per 100 parts of the base vinyl containing polymer, there may be utilized from 5 to 40 parts by weight a diorganopolysiloxane of the formula,

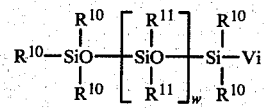

where $R^{10}$ is a monovalent hydrocarbon radical other than an olefinic hydrocarbon radical, Vi is vinyl, and $R^{11}$ is monovalent hydrocarbon radical and w varies such that viscosity of the diorganopolysiloxane varies from 50 to 50,000 centipoise at 25° C.

In Formula (4) $R^{10}$ is again preferably an alkyl radical of 1 to 8 carbon atoms, a phenyl radical or a 3,3,3-trifluoropropyl radical. For more information as to such polymers and their use in such SiH olefin platinum catalyst compositions, refer to the patent of Jeram et al, U.S. Pat. No. 3,957,713 which is hereby incorporated by reference. As pointed out previously, such polymer which have a terminal-vinyl group on one end of the siloxy chain and triorganosiloxy group on the other terminal position of the polymer chain, it is advantageous in increasing the tensile strength of the cured composition without unduly increasing the viscosity of the uncured total composition.

In addition to the foregoing compounds present in the composition, there may be present 100 to 100,000 parts per million of an inhibitor compound selected from the class consisting of vinyl containing organocyclo tetrasiloxanes such as a methyl vinyl cyclotetrasiloxane, trialkylcyanurate, an alkyl maleate and mixtures thereof. The example of alkyl maleate as an inhibitor as an addition curing silicone composition is, for instance, to be found in the patent application of Echberg, Ser. No. 40,015, now U.S. Pat. No. 4,256,870. With the exception of the alkyl maleates, the other inhibitors are relatively mild inhibitors which are utilized to give the composition when it has been mixed into a single mixture, a certain amount of shelf life at room temperatures so that the composition will cure at elevated temperatures, that is, temperatures about 100° C. in a matter of minutes and even seconds. However, if it is desired to the total composition a single package composition, there may be utilized an even stronger inhibitor, that is, there may be utilized at least 0.001 parts by weight per 100 parts of the base polymer of an inhibitor compound having at least one hydroperoxy radical of the formula —C—O—O—H as disclosed in Bobear, U.S. Pat. No. 4,061,604 which patent is hereby incorporated by reference in the present application. The hydroperoxy inhibitors allow all the ingredients to be mixed into a single package and yet the composition will not cure at room temperature for periods as long as six months to 1 year or even more, but when heat at elevated temperatures, that is temperatures above 100° C., will cure in a rapid manner.

In accordance with the present disclosure, it is possible to have an addition curing silicone composition with novel properties that has good Tensile Strength, Elongation, Tear and Duorometer hardness without an unduly high viscosity in the uncured state. This makes the composition desirable for liquid injection molding applications.

The Examples below are given for the purpose of illustrating the present invention and are not for the purpose of setting limits and boundaries in the disclosure of the instant case. All parts in the examples are by weight.

EXAMPLE 1

There was prepared a composition A comprising 30 parts by weight of a vinyl chain-stopped polymer of 80,000 centipoise viscosity, 31.8 parts at 4000 centipoise at 25° C. vinyl chain-stopped polymer 10.0 parts of silazane treated fumed silica, 15.0 parts of silazane treated precipitated silica. Both of these fumed silica were treated with hexamethyldisilazane. To this there was added 1.5 parts of titanium oxide, 10 parts per million of platinum as disclosed in Lamoraux patent as disclosed in U.S. Pat. No. 3,220,972, 15.0 parts of dimethylvinyl chain-stopped at one end and trimethylsiloxy at the other end of 500 centipoise viscosity fluid to form a Composition A.

There was formed a Composition B comprising 2 parts by weight of a resin compound of dimethyl hydrogen monofunctional siloxy units and tetrafunctional siloxy units where the resin contained 0.2 weight percent hydrogen. Eight parts of 4000 centipoise at 25° C. vinyl chain stopped dimethylpolysiloxane polymer and 5 parts by weight of a dimethyl hydrogen terminated dimethyl polysiloxane having 20 dimethyl siloxy units in the polymer chain. The mixed viscosity of Composition B was 150,000 centipoise. The mixed viscosity of composition A was 200,000 centipoise at 25° C. There was cured 100 parts of a composition A with 15 parts of Composition B are 100° C. for one hour and the composition had the following physicals:

| Shore A | 25 |
| Tensile | 625 psi |
| Elongation | 500% |
| Tear Strength | 170 pi |

EXAMPLE 2

There was prepared 100 parts of a composition C as 61.8 parts of 4000 centipoise at 25° C. vinyl chain stopped dimethylpolysiloxane polymer. There was added to this 10 parts of silazane treated fumed silica and 15 parts by weight of silazane treated precipitated silica. To this there was 5 parts by weight of vinyl dimethyl terminated trimethyl siloxy terminated polymethylsiloxy polymer of 500 centipoise at 25° C. To this mixture there was added 8 parts by weight of a hydrogen dimethyl terminated dimethyl polysiloxane hydride coupler of Example 1 to which was added 2.0 parts of the hydride resin of Example 1 and 500 parts per million of the inhibitor methyl vinyl cyclo tetrasiloxane the viscosity of mixed composition was 40,000 centipoise at 25° C. There was prepared a Composition D comprising 100 parts by weight of dimethyl vinyl chain-stopped at one end and trimethyl siloxy chain-stopped at the other end polymer of 500 centipoise at 25° C. with 100 parts per million of Lamoreaux catalyst. The resulting mixture had a viscosity of 40,000 centipoise at 25° C., 100 parts of the composition C which was cured with 10 parts of Composition D for 1 hour to produce a composition with the following physicals:

| Shore A | 21 |
| Tensile | 640 psi |
| Elongation | 540% |
| Tear Strength | 158 pi |

EXAMPLE 3

There was then prepared a composition E comprising 61.8 parts of 4000 centipoise at 25° C. vinyl chain-stopped polysiloxane polymer, 15.0 parts of silazane treated fumed silica, 15.0 parts of silazane treated precipitated silica, 5.0 parts of a vinyl dimethyl chain-stopped at one end and a trimethyl siloxy chain-stopped at the other end polymer of 500 centipoise at 25° C., 8.0 parts of the hydride coupler of Example 1, 2.0 parts of the hydride resin of Example 1 and 2000 parts per million of the methyl vinyl cyclotetrasiloxane inhibitor of Example 2. The viscosity of the mixed composition was 85,000 centipoise at 25° C. The resulting composition of composition E was cured by mixing 10 parts of Composition E with 1 part of each of four different catalyst compositions, compositions F, G, H, and I. Composition F comprises 100 parts by weight of the dimethyl vinyl, trimethyl silyl end-stopped polydimethylpolysiloxane of 500 centipoise at 25° C. and 100 parts per million of part is Lamoreaux catalyst. The viscosity of the resultant mixed composition was 85,000 centipoise at 25° C. Composition G comprises 100 parts by weight a dimethyl vinyl chain-stopped on both ends dimethylsiloxane polymer of 400 centipoise viscosity at 25° C. and 100 parts per million as platinum of Lamoreaux catalyst. Composition H comprise 50 parts by weight of a dimethyl vinyl chain-stopped on both ends, polydimethyl siloxane at 400 centipoise viscosity at 25° C. and 50 parts by weight 1 to 1 by weight of dimethyl vinyl trimethyl siloxy end-stopped polysiloxane at 500 centipoise viscosity. To this there was added 100 parts per million as platinum Lamoreaux catalyst. There was then prepared Composition I comprising 100 parts by weight of a dimethyl vinyl chain-stopped polydimethylpolysiloxane of 4000 centipoise viscosity to which was added 100 parts per million as platinum of Lamoreaux catalyst. The mixed viscosity of Composition G was 85,000 centipoise and then mixed viscosity of composition H was 85,000 centipoise at 25° C. The resulting compositions when utilizing 10 parts of weight of Compositions F, G, H, and I per 100 parts of Composition E were cured at 100° C. for 1 hour to yield cured elastomers having the following properties as shown in Table I below.

TABLE I

| 1/100° C. Physicals | 1/100° C. Physicals | 1/100° C. Physicals | 1/100° C. Physicals |
|---|---|---|---|
| Shore A | 23 | 34 | 27 | 28 |
| Tensile Strength psi | 770 | 735 | 720 | 750 |
| Elongation, % | 570 | 430 | 500 | 580 |
| Tear Strength, pi | 142 | 175 | 200 | 170 |

EXAMPLE 4

There was prepared a Composition J comprising 61.8 parts of a dimethyl vinyl chain-stopped polydimethyl siloxy polymer of 4,000 centipoise viscosity 15.0 parts of a silazane treated fumed silica 15.0 parts of a silazane treated precipitated silica filler, 5.0 parts of 1:1 dimethyl vinyl trimethylsiloxy end-stopped polydimethyl siloxane of 500 centipoise at 25° C. To 96.8 parts of the Composition J was added in each case the following parts hydride coupler of Example 1 and the hydride resin of Example 1 and also the concentration of Lamoreaux catalyst as shown in Table 2 below. The resulting compositions were cured for one hour at 100° C. and then the physicals were taken. The physicals of these compositions are shown in Table 2.

TABLE II

| | 4 | 5 | 6 | 7 | 8 | 9 | |
|---|---|---|---|---|---|---|---|
| Component | | | | | | | |
| Composition J | 96.8 pts. | 96.8 | 96.8 | 96.8 | 96.8 | 96.8 | 96.8 |
| Hydride Coupler of Example 1 | 8.0 | — | 2.0 | 4.0 | 6.0 | 8.0 | 12.0 |
| Hydride Resin of Example 1 | 2.0 | 2.0 | 2.0 | 2.0 | 2.0 | 2.0 | 1.5 |
| Methyl Vinyl Tetramer | 2,000 ppm | 2,000 ppm | 2,000 ppm | 2,000 ppm | 2,000 ppm | 2,000 ppm | 2,000 ppm |

TABLE II-continued

|  | 4 | 5 | 6 | 7 | 8 | 9 |
|---|---|---|---|---|---|---|
| Lamoreaux Platinum Catalyst | 10 ppm pt | 10 ppm Pt | 10 ppm Pt | 10 ppm Pt | 10 ppm Pt | 10 ppm Pt | 10 ppm Pt |
| 1/100° C. Physicals |  |  |  |  |  |  |
| Shore A | 34 | 46 | 45 | 43 | 37 | 34 | 24 |
| Tensile | 735 | 750 | 715 | 745 | 680 | 735 | 500 |
| Elongation | 430 | 300 | 340 | 380 | 410 | 430 | 450 |
| Tear Strength | 175 | 60 | 60 | 64 | 200 | 175 | 166 |

We claim:

1. An addition curing silicone composition with a low viscosity in the uncured state and a high physical strength in the cured state comprising (A) 100 parts by weight of a vinyl-containing diorganopolysiloxane having a viscosity varying from 100 to 200,000 centipoise at 25° C., where the diorganovinylsiloxy content varies from 0.14 to 2.0 mole percent and the organo group is a monovalent hydrocarbon radical; (B) from 0.1 to 500 parts per million of a platinum catalyst; (C) from 0.1 to 25 parts by weight of a crosslinker selected from the class consisting of hydride resins having only terminal hydrogen atoms and linear hydride polysiloxanes wherein said linear hydride polysiloxane has hydrogen atoms only in the internal position of the siloxane chain, and (D) from 75 to 150 parts by weight of a linear hydride polysiloxane coupler having hydrogen atoms bonded only at the terminal silicone atoms in the siloxane chain wherein said coupler has a dimethyl hydrogen siloxy content of from 3.0 to 9.0 mole percent and the viscosity of the linear hydride coupler varies from 1 to 500 centipoise at 25° C.

2. The composition of claim 1 wherein the coupler has the formula,

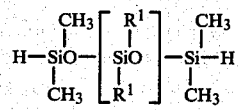

where $R^1$ is a monovalent hydrocarbon radical other than olefinic hydrocarbon radicals and n varies such that the viscosity of the polymer varies from 1 to 500 centipoise at 25° C.

3. The composition of claim 2 wherein there is present from 5 to 100 parts by weight of a filler.

4. The composition of claim 3 wherein the filler is selected from the class consisting of fumed silica, precipitated silica and mixtures thereof.

5. The composition of claim 4 wherein the vinyl-containing diorganosiloxane has the formula,

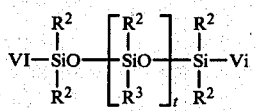

where Vi is vinyl and $R^2$, $R^3$ are monovalent hydrocarbon radicals other than olefinic hydrocarbon radicals and t varies such that the diorganopolysiloxane's viscosity varies from 100 to 200,000 centipoise at 25° C.

6. The composition of claim 5 wherein the crosslinker is selected from the class consisting of a hydride resin having

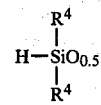

units, and $SiO_2$ units where the $R^4$+H to Si ratio varies from 1.0 to 2.7 and hydride resin of the formula,

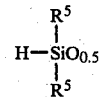

units $SiO_2$ and $R^6R^6SiO$ units where the $R^5+R^6+H$ to Si ratio varies from 1.2 to 2.7 where $R^4$, $R^5$ and $R^6$ are monovalent hydrocarbon radicals other than olefinic hydrocarbon radicals.

7. The composition of claim 5 wherein the crosslinker is a linear hydride polysiloxane having the formula,

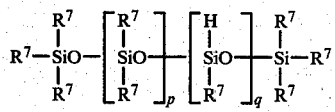

where $R^7$ is a monovalent hydrocarbon radical other than an olefinic hydrocarbon radical and p and q vary such that the hydride polysiloxane has a viscosity that varies from 1 to 1,000 centipoise at 25° C. and wherein the polysiloxane has from 0.4 to 1.6% by weight of hydrogen.

8. The composition of claim 7 wherein there is further present from 10 to 100 parts by weight of an organopolysiloxane copolymer comprising $R^8_3SiO_{0.5}$ units and $SiO_2$ units where $R^8$ is a radical selected from the class consisting of vinyl radicals, alkyl radicals, aryl radicals and fluoroalkyl radicals wher the weight ratio of monofunctional units to tetrafunctional units is from 0.5:1 to 1:1 and wherein from about 2.5 to 10 mole percent of the silicon atoms contain siloxane bonded vinyl groups.

9. The composition of claim 7 wherein there is further present from 10 to 100 parts by weight of an organopolysiloxane copolymer comprising $R^8_3SiO_{0.5}$ units, $R^8_2SiO$ units and $SiO_2$ units where $R^8$ is a radical selected from the class consisting of vinyl radicals, aryl radicals, alkyl radicals and fluoroalkyl radicals where the ratio of monofunctional units to difunctional units is from 0.5:1 to 1:1 and the difunctional units are present in an amount equal to from about 1 to 10 mole percent based on the total number of siloxane units in the copolymer and where from about 2.5 to 10 mole percent of the silicone atoms contain silicon bonded vinyl groups.

10. The composition of claim 7 wherein there is further present from 5 to 40 parts by weight of diorganopolysiloxane of the formula,

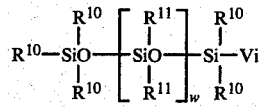

where $R^{10}$ is a monovalent hydrocarbon radical other than an olefinic hydrocarbon radical, Vi is vinyl, and $R^{11}$ is a monovalent hydrocarbon radical and w varies such that the viscosity of the diorganopolysiloxane varies from 50 to 50,000 centipoise at 25° C.

11. The composition of claim 7 wherein there is further present in the composition from 100 to 100,000 parts per million of an inhibitor compound selected from the class consisting of vinyl-containing organocyclotetrasiloxane, trialkyl cyanurate, alkyl maleate and mixtures thereof.

12. The composition of claim 7 wherein there is present at least 0.001 parts by weight of an inhibitor compound having at least one hydroperoxy radical of the formula,

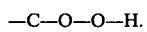
—C—O—O—H.

13. A process for forming an addition cure silicone composition with a low viscosity in an uncured state comprising (1) mixing (A) 100 parts by weight of a vinyl-containing diorganopolysiloxane having a viscosity varying from 100 to 200,000 centipoise at 25° C., where the diorganovinylsiloxy content varies from 0.14 to 2.0 mole percent and the organo group is a monovalent hydrocarbon radical; (B) from 0.1 to 500 parts per million of a platinum catalyst; (C) from 0.1 to 25 parts by weight of a crosslinker selected from the class consisting of hydride resins having only terminal hydrogen atoms and linear hydride polysiloxanes wherein said linear hydride polysiloxane has hydrogen atoms only bonded at the internal position of the siloxane chain, and (D) from 4 to 15 parts by weight of a linear hydride polysiloxane coupler having hydrogen atoms bonded only at the terminal silicone atoms in the siloxane chain wherein said coupler has a dimethyl hydrogen siloxy content of from 3.0 to 9.0 mole percent and the viscosity of the linear hydride coupler varies from 1 to 500 centipoise at 25° C., and (2) allowing the composition to cure to a silicone elastomer.

14. The process of claim 13 wherein the coupler has the formula,

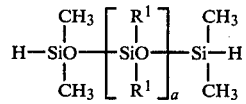

where $R^1$ is a monovalent hydrocarbon radical other than olefinic hydrocarbon radicals and a varies such that the viscosity of the polymer varies from 1 to 1000 centipoise at 25° C.

15. The process of claim 13 wherein there is further present 5 to 100 parts by weight of a filler.

16. The process of claim 15 wherein the filler is selected from the class consisting of fumed silica, precipitated silica and mixtures thereof.

17. The process of claim 16 wherein the vinyl containing diorganopolysiloxane polymer has the formula,

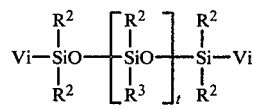

where Vi is vinyl and $R^2$ and $R^3$ are monovalent hydrocarbon radicals other than olefinic radicals and t varies such that the diorganopolysiloxane polymer viscosity varies from 100 to 200,000 centipoise at 25° C.

18. The process of claim 17 wherein the crosslinking agent is selected from the class consisting of a hydride resin having

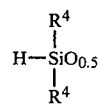

units and $SiO_2$ units where the $R^4 + H$ to Si ratio varies from 1.0 to 2.7 and hydride resin of the formula,

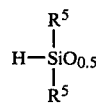

units, $SiO_2$ and $R^6R^6SiO$ units where the $R^5+R^6+H$ to Si ratio varies from 1.2 to 2.7 where $R^4$, $R^5$ and $R^6$ are monovalent hydrocarbon radicals other than olefinic hydrocarbon radicals.

19. The process of claim 17 wherein the crosslinker is a linear hydride polysiloxane having the formula,

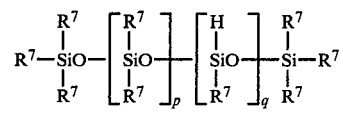

where $R^7$ is a monovalent hydrocarbon radical other than an olefinic hydrocarbon radical and p and q vary such that the hydride polysiloxane has a viscosity that varies from 1 to 1,000 centipoise at 25° C. and wherein the polysiloxane has from 0.4 to 1.6% by weight of hydrogen.

20. The process of claim 19 where there is further present from 10 to 100 parts by weight of an organopolysiloxane copolymer comprising $R^8_3 SiO_{0.5}$ units and $SiO_2$ units where $R^8$ is a radical selected from the class consisting of vinyl radicals, alkyl radicals, aryl radicals, and fluoroalkyl radicals where the weight ratio of monofunctional or tetrafunctional is from 0.5:1:1 and wherein from about 2.5 to 10 mole percent of the silicone atoms contain silicon bonded vinyl groups.

21. The process of claim 19 wherein there is further present from 10 to 100 parts by weight of an organopolysiloxane copolymer comprising $R^8_3 SiO_{0.5}$ units, $R^8_2SiO$ units and $SiO_2$ units where $R^8$ is a radical selected from the class consisting of vinyl radicals, aryl radicals, alkyl radicals and fluoroalkyl radicals where the weight ratio of monofunctional units to difunctional units is from 0.5:1 to 1:1 and the difunctional units are present in an amount equal to from 1 to 10 mole percent making the total number of siloxane units in the copolymer and where from about 2.5 to 10 mole percent of the silicone atoms contain silicon bonded vinyl groups.

22. The process of claim 19 where there is further present from 5 to 40 parts by weight of a diorganopolysiloxane of the formula,

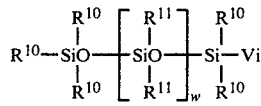

where $R^{10}$ is a monovalent hydrocarbon radical other than an olefinic hydrocarbon radical, Vi is vinyl, and $R^{11}$ is a monovalent hydrocarbon radical and w varies such that the viscosity of the diorganopolysiloxane varies from 50 to 50,000 centipoise at 25° C.

23. The process of claim 19 where there is further present in the composition from 100 to 10,000 parts per million of an inhibitor compound selected from the class consisting of vinyl-containing organocyclotetrasiloxanes, trialkyl cyanurates, alkyl maleates and mixtures thereof.

24. The process of claim 19 wherein there is further present at least 0.001 parts by weight of an inhibitor compound having at least one hydroperoxy radical of the formula,

—C—O—O—H.

* * * * *